United States Patent Office 3,349,265
Patented Oct. 24, 1967

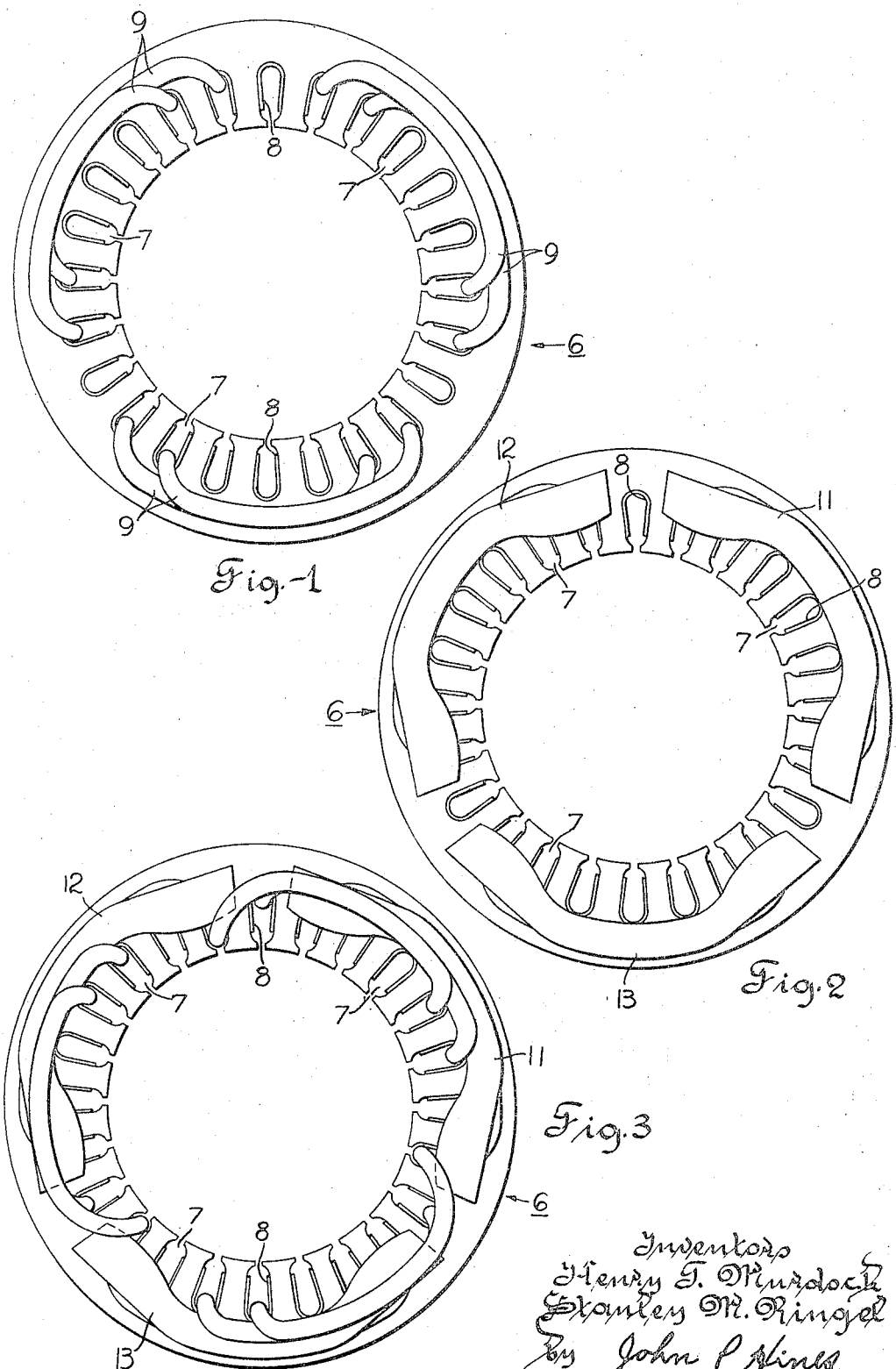

3,349,265
PHASE INSULATION FOR POLYPHASE DYNAMOELECTRIC MACHINES
Henry T. Murdock and Stanley M. Ringel, Cincinnati, Ohio, assignors to Allis-Chalmers Manufacturing Company, Milwaukee, Wis.
Filed June 3, 1965, Ser. No. 460,988
2 Claims. (Cl. 310—194)

This invention pertains to dynamoelectric machines, and more particularly to phase insulation for the end turns of polyphase dynamoelectric machines.

Phase insulation is required between each phase of a polyphase dynamoelectric machine such as induction motors. Insulating material is positioned in the coil slots and also between the end turns of the coils. After one phase has been wound, the insulation is attached to the end turns and the next phase is then wound over the insulation.

The phase insulation previously used not only covered the coil end turns, but also the ends of the slots not yet filled with coils. Because of this the phase insulation had to be moved as subsequent coils were wound so it would not interfere with the proper placement of the coil sides in the coil slots. It is therefore the general purpose and object of this invention to provide a phase insulation which covers only those slots of the dynamoelectric machine which have been filled with coil sides and leave the remaining unfilled slots uncovered.

This and other objects of the subject invention will become more fully apparent as the following description is read in light of the attached drawing wherein:

FIG. 1 is a schematic cross section taken through a dynamoelectric machine having the coils for one phase installed in the coil slots;

FIG. 2 shows the phase insulation for the first phase disclosed in FIG. 1; and

FIG. 3 shows a subsequent phase of coil windings applied over the phase insulation of FIG. 2.

Referring to the attached drawing, the invention is described in connection with a conventional motor stator generally designated 6. The stator 6 has a plurality of longitudinally extending circumferentially spaced slots 7 contained therein. These slots are lined with an insulation 8 as is conventional in the art.

As shown in FIG. 1, a series of coils 9 are provided in the bottoms of certain slots. These coils make up one phase of the dynamoelectric machine. It is therefore necessary to provide an insulation about the end turns of the coils before applying subsequent phase windings.

Referring to FIG. 2, phase insulation is shown applied to the end turns shown in FIG. 1. For purposes of illustration, this phase insulation comprises three individual sections 11, 12 and 13. The sections of phase insulation are substantially arcuate so as to follow the outer circular configuration of the dynamoelectric machine body or in this instance the motor stator. It will be noted that the configuration of each phase insulation section is such that only those slots which contain coil sides are covered. The remaining unfilled slots and the unfilled portions of partially filled slots are uncovered so as to freely accept additional phase windings.

After the phase insulation has been applied to the coil end turns, the subsequent phase coil sides are placed in the proper stator slots. This is clearly shown in FIG. 3. After the coils making up the second phase have been properly placed in the stator slots, additional phase insulation is applied to the second phase coil end turns. These phase sections (not shown) are also constructed in a manner so that only those stator slots which are completely filled are covered with the insulation. The unfilled slots and the remaining unfilled portions of the partially filled slots are left uncovered for the subsequent coil sides.

It is also a part of this invention that one side of the phase insulation will have an adhesive applied thereto. Because of this the phase insulation is applied by merely sticking the phase insulation to the coil end turns.

From the above it can be seen that with this type of phase insulation it is a simple matter to insert subsequent phase coils after the insulation has been applied to the previously wound phase end turns. The phase insulation is so constructed that the unfilled stator slots are always left uncovered to permit the easy insertion of subsequently applied coils.

Although only one embodiment of the subject invention has been herein shown and described, modifications will be apparent after this description is read, and it is intended that all such modifications as come within a reasonable interpretation of the appended claims be covered.

The embodiments of the invention in which an exclusive property or privilege is claimed are defined as follows:

1. In combination with a polyphase dynamoelectric machine having a body with a plurality of circumferentially spaced slots including a plurality of coils placed therein with the end turns thereof extending beyond the end of the body, phase insulation comprising a sheetlike electrically insulating material positioned between the coil end turns of each phase, said insulating material having a configuration to cover only those slots which have a coil side therein and to leave the remaining unfilled coil slots uncovered.

2. The combination set forth in claim 1 wherein at least one side of the phase insulation has an adhesive coating thereon.

UNITED STATES PATENTS
References Cited

| | | | |
|---|---|---|---|
| 1,904,514 | 4/1933 | Oldenburg | 310—260 |
| 2,404,129 | 7/1946 | Flatland | 310—194 |
| 2,660,681 | 11/1953 | Horne | 310—208 |

MILTON O. HIRSHFIELD, *Primary Examiner.*
L. L. SMITH, *Assistant Examiner.*